United States Patent [19]
Gürtler et al.

[11] Patent Number: 4,589,680
[45] Date of Patent: May 20, 1986

[54] INSTALLATION FOR DISPLACING A BELT BAND

[75] Inventors: Franz Gürtler, Unterschleissheim; Robert Wimmer, Ebersberg, both of Fed. Rep. of Germany

[73] Assignee: Bayerische Motoren Werke AG, Fed. Rep. of Germany

[21] Appl. No.: 572,020

[22] Filed: Jan. 19, 1984

[30] Foreign Application Priority Data

Jan. 22, 1983 [DE] Fed. Rep. of Germany ....... 3302163

[51] Int. Cl.⁴ ............................................. B60R 22/00
[52] U.S. Cl. .................................. 280/801; 280/804; 280/808; 180/268
[58] Field of Search ....................... 280/801, 804, 808; 180/286, 268

[56] References Cited

U.S. PATENT DOCUMENTS 4,291,898  9/1981  Finn et al. ........................... 280/808

FOREIGN PATENT DOCUMENTS 2543784   5/1977  Fed. Rep. of Germany ...... 280/808
2713172  10/1978  Fed. Rep. of Germany ...... 280/804
2822055  11/1979  Fed. Rep. of Germany .
2920094  11/1980  Fed. Rep. of Germany ...... 280/808
2942207   4/1981  Fed. Rep. of Germany .
3102262   8/1982  Fed. Rep. of Germany .

Primary Examiner—John J. Love
Assistant Examiner—Kenneth R. Rice
Attorney, Agent, or Firm—Craig and Burns

[57] ABSTRACT

An installation for the displacement of a belt band, i.e., a safety belt in a vehicle, into a position favorable for being seized by the passenger, in which a vehicle lateral wall, especially a vehicle door, includes a guide rail in which a guide element is retained movable to and fro in the driving direction; an entrainment member is pivotally secured at the guide element, which in the rest position is pivoted into the vehicle door out of sight; during the transporting, the entrainment member pivots out of the vehicle door, engages the belt band from behind and displaces the same into a position favorable for pick-up by the passenger.

23 Claims, 7 Drawing Figures

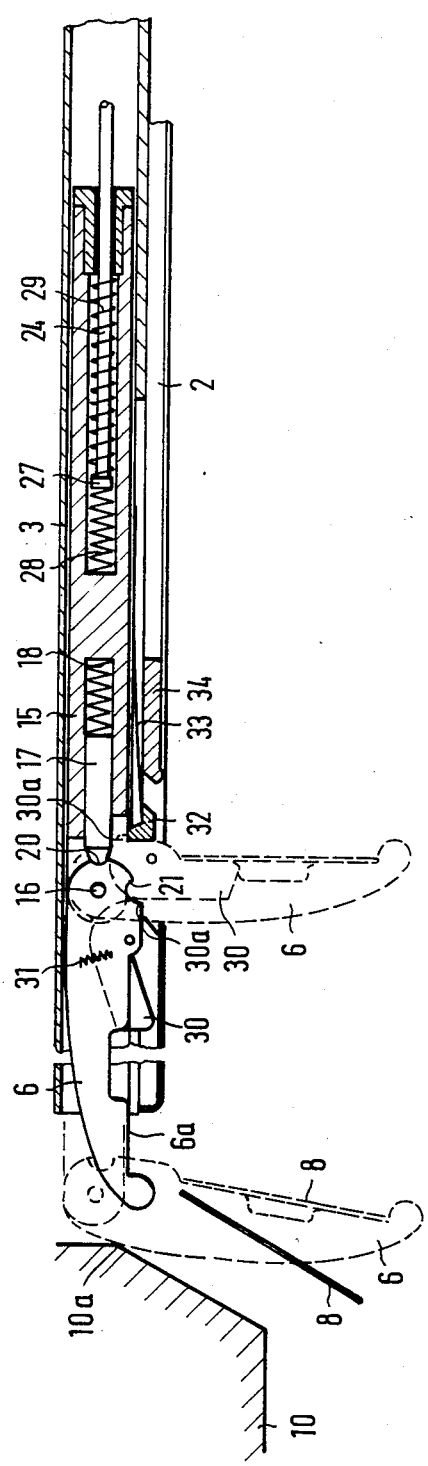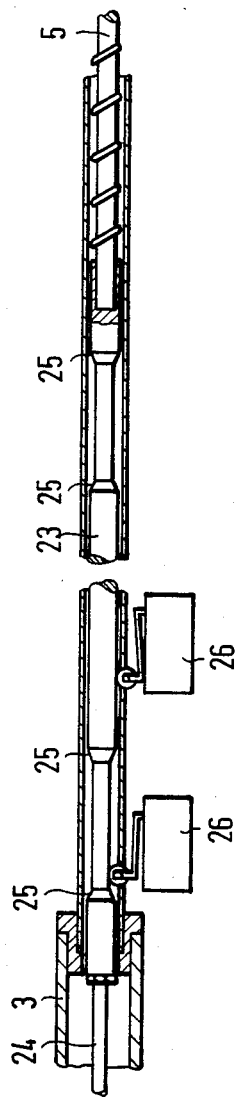

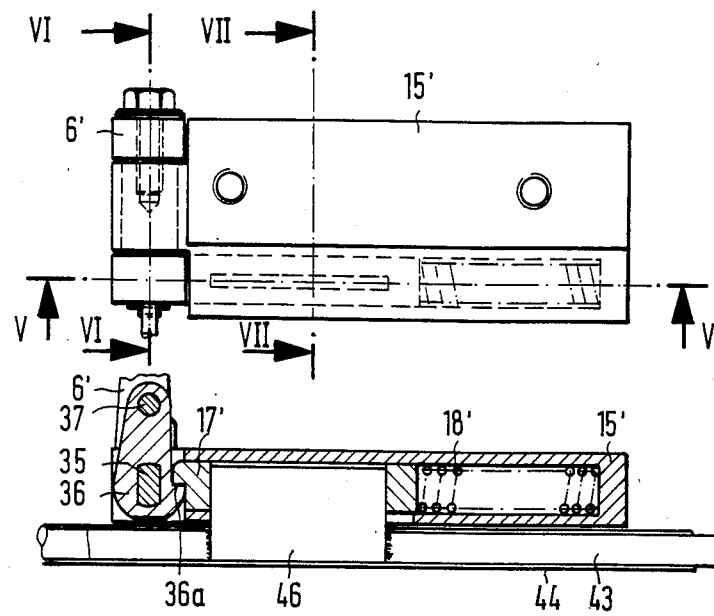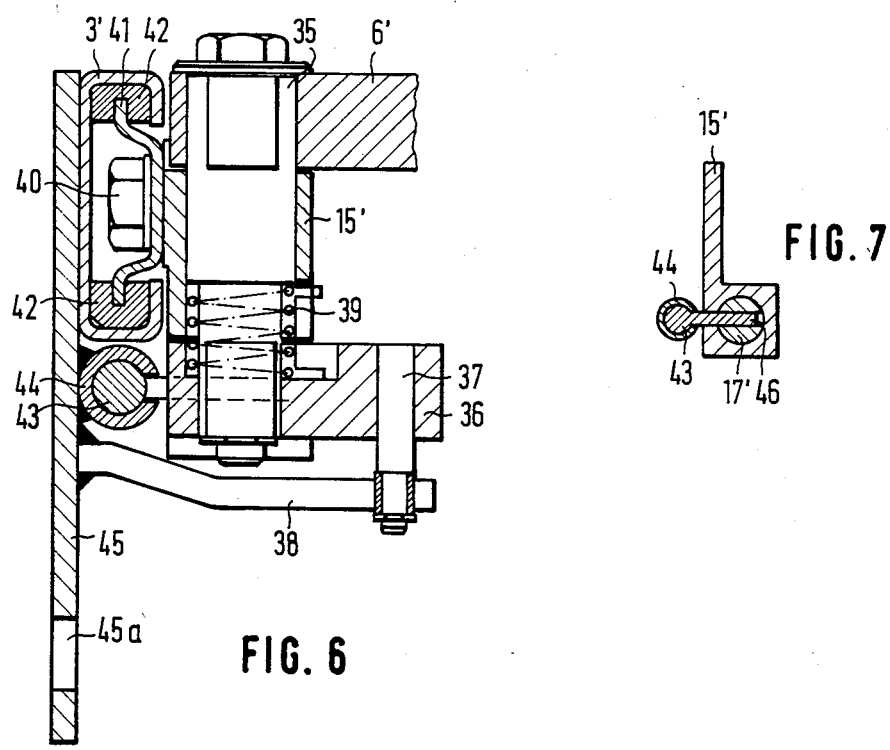

INSTALLATION FOR DISPLACING A BELT BAND

The present invention relates to an installation for displacing a belt band of a seat belt into a position in motor vehicles which permits easy gripping thereof.

An installation generally of this type is disclosed in German Offenlegungsschrift 28 22 055. In the system disclosed in this Offenlegungsschrift, the guide element includes a rod, whose rear end is bent over into an entrainment member. The rigid connection resulting therefrom between the guide element and the entrainment member is disadvantageous for several reasons. The belt band to be displaced of a non-fastened safety belt which is provided for the front seats of a motor vehicle, extends as a rule along the center column, i.e., to the rear of the door cut out. If one wishes to engage the belt band from behind by means of the entrainment member of the prior art installation which in this case must be provided at the front vehicle door, then one has to displace the entrainment member toward the rear beyond the door cut out. The rod serving as the guide element blocks in this position the vehicle door which can then no longer be opened from the outside and blocks thereby the access into the vehicle interior, which can create a dangerous situation for example, in case of an accident. This danger, however, exists not only during the belt fetching phase. The rod may displace itself toward the rear into the blocking position by the forces occurring during an accident.

Installations of the aforementioned type are provided predominantly for motor vehicles belonging to the upperprice group. They must therefore be able to be integrated harmonically into the overall construction. To the extent possible, they should not appear or become noticeable at all or only in a subdued manner hinting at their existence. This can be achieved by the guide rail being inserted into the sidewall and is covered off at least partially by the wall covering. However, this is only conditionally possible in an installation according to the state of the art because, as already mentioned, the entrainment member has to be displaced beyond the door cut out. Additionally, the entrainment member will always remain visible, even if it is pivoted downwardly about the longitudinal axis of the rod. In this case, it rests at the covering. The further disadvantage results therefrom that the passenger risks the danger of getting his or her clothing caught on the entrainment member.

It is the object of the present invention to so further develop an installation of the type described hereinabove that the entrainment member is able to engage the belt band from behind without blocking the vehicle door and that the installation is not perceived altogether displeasingly.

The underlying problems are solved according to the present invention in that the entrainment member is movably retained at the guide element.

Due to the movable arrangement of the guide element of the instant invention the entrainment member can be changed from a non-interfering normal or rest position into an operating or transport position. The arrangement according to the present invention may take various forms and for example, it may be so constructed that the entrainment member moves into a respective position during translatory movement pointing transversely to the vehicle longitudinal direction. However, in one appropriate embodiment of the present invention, the entrainment member is rotatably supported at the guide element. In this case, the entrainment member carries out a pivot movement into the vehicle interior when passing from the rest position into the operating position.

It is advantageous if the entrainment member, in its rest position, is displaced completely behind the inner surface of the vehicle sidewall. It is then no longer visible and also represents no injury danger. If, however, for space reasons or other reasons a complete recessing is not possible, then it may also be appropriate to permit the entrainment member to project slightly above the surface of the sidewall.

In the installation according to the present invention, the guide rail and the guide element are disposed inside of the sidewall. The wall covering covers these structural elements and it includes merely a narrow slot for the to and fro movement of the entrainment member.

As a result of the movable pivotal arrangement of the guide element, the entrainment member is accordingly in a position to seize the belt band without the need of the guide element moving beyond the door cut out. This is to be made clear by the operating sequence of a transporting operation by means of an installation in accordance with the present invention, in which the entrainment member is rotatably retained relative to the guide element.

If the installation according to the present invention, which is installed into a front vehicle door, is set into operation, either by a door contact switch or by an intentionally actuated switch or otherwise, the guide element together with the folded-in entrainment member travels in the direction toward the vehicle rear. A control edge or surface, in the most simple case, is formed by the edge of the door cut out, forces the entrainment member out of its position and gradually pivots the same into its transporting position. In the transporting position, the entrainment member is approximately perpendicular to the guide rail and projects into the vehicle interior. However, before it has finally reached this position, it traverses the intermediate space between belt band and center column and engages the belt band from behind when in the semipivoted-out condition. If it passes over into its final transporting position, the guide element has arrived at the door edge or in proximity thereof. Thus, at no time will a situation will occur, in which the vehicle door could be blocked by the guide element or the entrainment member.

During the further course of the transporting operation, the movement direction reverses, and the guide element now travels in the forward direction. The entrainment member is engaged with and pulls the belt band into a position in which it can be easily seized or gripped by the vehicle occupant seated proximate the respective vehicle door. After the vehicle passenger has taken the belt band from the entrainment member, the entrainment member folds or pivots back into its rest position. The folding or pivoting back takes place in a preferred embodiment by an abutment which is located, for example, in the door covering or on the guide rail. The guide element is provided for that purpose with a locking bolt displaceable against spring force. During the belt transport, the locking bolt engages in a recess of the pivoted-out entrainment member or of a part rigidly connected therewith and stops the same at its position. If the entrainment member impinges against the abutment, the locking bolt is retracted. The entrainment member is now released and can fold or pivot back into its original or rest position. It is thereby advantageous if the entrainment member is rotated back into this position by a spring force. Additionally, it may be appropriate to provide at the entrainment member a second recess or aperture, into which the locking bolt engages when the entrainment member is foled in or pivoted in, and retains the same in its position.

This mechanism is also operable if the entrainment member encounters an obstacle during its transporting operation.

In one advantageous embodiment of the present invention, the entrainment member is locked during the belt transport. During the transporting operation, the entrainment member travels up to the abutment and a spring acting on the guide element is thereby stressed in the end phase. If the passenger removes or picks up the offered belt, the locking mechanism is disengaged and the spring is released. The spring, in turn, now pulls the entrainment member against the abutment which again urges the entrainment member into its rest position. In lieu of stressing a spring, the guide element, after picking up the belt band or, if this does not occur, after a predetermined time, may be continued to be moved in the pre-existing direction in any other conventional manner until the entrainment member is folded or pivoted into its rest position.

The transporting operation may now be terminated. However, it is advantageous if the guide element again travels a distance rearwardly into a starting position, from which during the next transporting operation the entrainment member is pivoted out without great time delay in order to be able to offer the safety belt to the vehicle passenger as quickly as possible.

As already mentioned above, the edge of the door cut out may serve as abutment for the folding-out or pivoting-out of the entrainment member. However, the danger exists that as a result thereof the edge will become worn and become unattractive. In order to prevent this, it may be appropriate to positiviely control the entrainiment member by way of a curved track or cam. It is further appropriate in that case if the entrainment member is ridigly connected with a guide bolt which moves along a correspondingly constructed curved back or cam while engaging the belt band from behind.

The drive may be realized in any known manner. However, it is appropriate to connect the guide element with a threaded cable which, in turn, is driven by any appropriate motor such as a worm-gear motor. As a result of the flexibility of the threaded cable, the restricted space conditions in a vehicle sidewall can be better accommodated with this type of drive. Furthermore, it is of advantage to construct the connection between threaded cable and guide element in a springy or elastic manner. One obtains thereby a softer movement progress. It is particularly advantageous to utilize for that purpose the springy support of the locking bolt.

Limit switches or reversing switches are provided for the control of the movement sequence in a simple manner which are actuated by means of corresponding stops at the threaded cable or a part connected therewith.

The installation according to the present invention is not limited to front vehicle seats but may also be provided for the safety belts in rear seats, independently of whether the rear seats are accessible or not through their own doors. Quite generally, the installation according to the present invention can be used wherever the non-fastened safety belt is in a position not favorable for seizing by the passenger.

The installation according to the present invention can be preassembled into a complete unit and then be secured in the vehicle wall. As a result thereof a rapid assembly in series-production is possible.

These and other objects, features and advantages of the present invention will become more apparent from the following description when taken in connection with the accompanying drawing which shows, for purposes of illustration only, two embodiments in accordance with the present invention, and wherein:

FIG. 2 is a cross-sectional view through a first embodiment of the present invention;

FIG. 3 is a somewhat schematic cross-sectional view through a threaded cable for the to and fro movement of the guide element according to FIG. 2;

FIG. 4 is an elevational view of a guide element of a second embodiment in accordance with the present invention;

FIG. 5 is a cross-sectional view taken along line V—V of FIG. 4;

FIG. 6 is a cross-sectional view, on an enlarged scale, taken along line VI—VI of FIG. 4; and FIG. 7 is a partial cross-sectional view taken along line VII—VII of FIG. 4.

Figure 1:
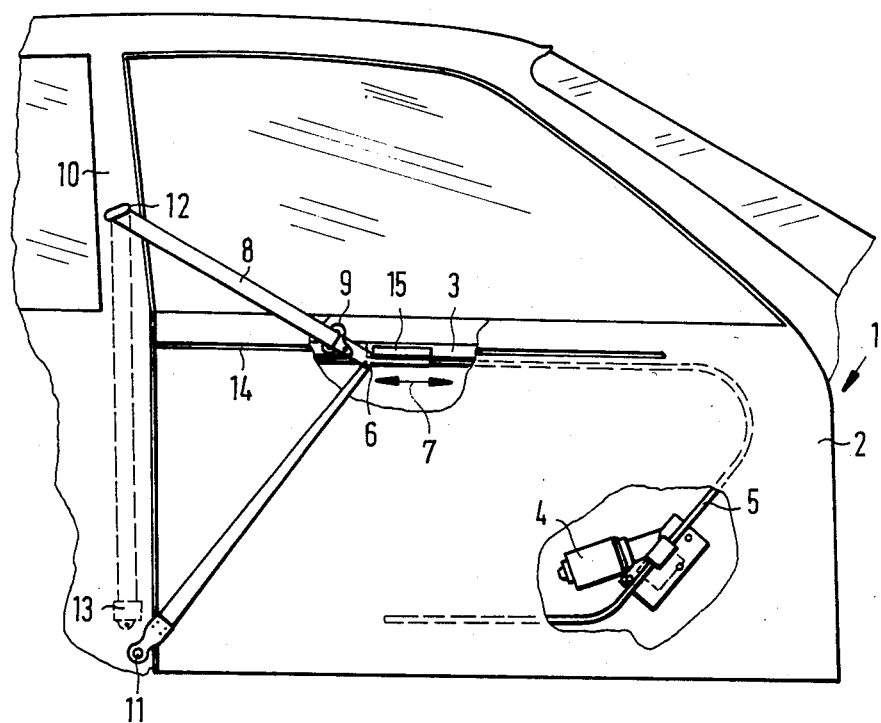
FIG. 1 is a partially broken-away side view of a vehicle door with a belt displacement installation according to the present invention.

Referring now to the drawing wherein like reference numerals are used throughout the various views to designate like parts, FIG. 1 illustrates partly a motor vehicle body with a front vehicle door generally designated by reference numeral 1, whose inner covering 2 is partly broken away. An installation in accordance with the present invention which becomes visible as a result of the broken-away parts of the inner covering 2, includes a guide rail 3 and a motor 4 which drives a threaded cable 5 by conventional means such as a conventional worm-gear drive. An entrainment member 6 is movable to and fro in the direction of the double arrow 7 within the guide rail 3 by way of the threaded cable 5. The entrainment member 6 as shown in FIG. 1 has seized the belt band 8 of a conventional three point safety belt below the latch tongue 9 thereof and displaced the same forwardly in the driving direction into a position which is favorable for seizing the same by the vehicle passenger (not shown). The belt band 8 itself extends in the nonfastened and not forwardly displaced condition along a center column 10 of the motor vehicle body. It is thereby secured at a point 11 at the center column 10 and extends by way of a reversing fitting 12 into the center column 10 toward a belt retractor 13 in the vicinity of the fastening point 11. For the displacement movement of the entrainment member 6 along the arrow 7, the inner covering 2 is provided with a narrow slot 14, through which the entrainment member 6 extends during the forward displacement of the belt band 8.

FIG. 2 illustrates in detail the guidance and mounting of the entrainment member 6 in the guide rail 3 from the above. The guide rail 3 is secured behind the inner covering 2 either at the door covering itself or at an inner door sheet metal member (not illustrated). A guide element 15 is displaceably arranged in the guide rail 3, which at its end facing the vehicle rear, rotatably retains the entrainment member 6 by way of a bearing bolt 16. A locking bolt 17 is provided in the guide element 15, which can be pushed into the guide element 15 by the force of a spring 18. The spring 18 is supported by the guide element 15. The locking pin 17 engages with its end projecting out of the guide element 15 a recess 20 of the entrainment member 6 and thereby fixes the position of the same. The entrainment member 6 includes a further recess 21 for the locking bolt 17. The locking bolt 17 engages in this recess 21 when the entrainment member 6 is pivoted or folded out, as is shown in FIG. 2 in dash lines.

The threaded cable 5 indicated in FIG. 3 effects the displacement of the guide element 15 in the guide rail 3. For that purpose, the threaded cable 5 includes an end portion 23 offset several times, on which a rod 24 (FIG. 3) is threadly attached and which extends into the guide element 15 (FIG. 2). An end piece 23 includes abutments 25 formed by the offset sections and thereby cooperates with electrical switches 26 which, in turn, again act on the motor 4 in a conventional manner (not shown) to control the same. The rod 24 includes at its end located in the guide element 15 a piston-like part 27 (FIG. 2) whereby springs 28 and 29 are supported at the two end faces of the piston-like part 27. The springs 28 and 29 serve to provide a soft movement course of the guide element 15.

The entrainment member 6 includes an engaging surface 6a coordinated to the belt band 8. Additionally, a locking catch 30 is rotatably supported in the entrainment member 6, which is partly forced out of the entrainment member 6 by a spring 31 and as a result thereof, projects beyond the engaging surface 6a. A detent nose 30a is formed on the locking catch 30 which with a pivoted-out entrainment member 6 cooperates with a locking element 32. The locking element 32 itself is secured at the guide element 15 by means of a leaf spring 33 approximatley axially aligned with the guide rail 3.

A belt transport will now be explained by reference to FIG. 2. As already indicated, the rest phase or parking position of the installation is indicated in FIG. 2 in full lines whereas the dash lines illustrate the forwardly displaced position of the part. In the normal rest phase, the entrainment member 6 is pivoted into the guide rail 3 and is stopped by way of the locking bolt or locking pin 17. It should also be noted that the guide rail 3 in the most simple case includes a tubular member or pipe with a slot for the passage of the entrainment member 6. After actuation of a corresponding switch at the door, and the vehicle seat or anywhere else, the motor 4 is energized and displaces the guide member 15 and entrainment member 6 in the direction toward the vehicle rear by way of the threaded cable 5. The entrainment member 6 abuts soon at an inclined surface 10a on the center column 10 and is thereby forced out to a position transverse to the longitudinal direction of the vehicle. The locking bolt or pin 17 slides into the guide element 15. As a result of its gradual pivoting-out, the entrainment member 6 passes between the belt the belt band 8 and the center column 10 and finally engages the belt band 8 from behind. The entrainment member 6 now finally pivots into ts transporting position. The entrainment member 6 is thereby approximately perpendicular to the guide rail 3 and projects into the vehicle interior. In this new position, the entrainment member 6 is again stopped by way of the locking pin 17 cooperating with the recess 21. Since the entrainment member 6 has already picked up the belt band 8 in this position, the locking catch 30 is pressed into the entrainment member 6 by the belt band 8 and the detent nose portion 30a extends over the locking element 32.

As soon as the entrainment member 6 is pivoted into its transporting position, the motor 4 is reversed. The entrainment member 6 now moves together with the belt band 8 in the forward direction up to an abutment 34 in the inner covering 2 of the door. In FIG. 2 the entrainment member 6 is shown a short distance from the abutment 34. Upon arrival at the abutment 34, the motor 4 continues to run for a short period of time. The spring 29 is thereby compressed and prestressed. Thereupon, the motor 4 is de-energized. The belt band 8 is now in a position which is favorable for pick-up by the vehicle passenger. If the passenger picks up and removes the belt 8 from the entrainment member 6, then the spring 31 pushes the locking catch 30 out of the entrainment member 6. The detent nose portion 30a releases the locking element 32. Due to the prestressed spring 29, the locking element 32 slides inwardly over the abutment 34. The entrainment member 6 is pulled toward the abutment 34, and is forced by the latter into its pivoted-in rest position.

As soon as the entrainment member 6 is pivoted-in, the motor 4 can again be started, and the guide element 15 can travel back into its original rest position. The electric switches 26 together with the abutments 25 of the end portion 23 undertake the control of the motor 4 in the illustrated embodiment. However, it can be readily seen that the functioning of the installation is not dependent on this type of the control. If the space conditions in the vehicle door are constricted, for example, the end portions 23 can be omitted. The actuation of the switches can then be realized by the guide element 15 or by a part rigidly connected therewith. However, the pulses for the reversing control of the motor 4 can also be produced in any other manner as known to those skilled in the art. Also an electric switch may be coordinated to the belt buckle which upon engagement of the buckle catch causes the motor to start to operate.

If the entrainment member 6 should encounter a larger resistance in its forward travel, then it forces the locking pin 17 into the guide element 15 and the entrainment member 6 thus pivots into its rest position. The belt is then pulled back into its starting position by the belt retractor 13.

FIG. 4 illustrates a second embodiment of a guide element 15'. An entrainment member 6', similar to entrainment element 6, is rotatably supported at the guide element 15'. As shown in FIG. 6, which is shown on an enlarged scale for better understanding, the entrainment member 6' is rigidly connected with a lever 36 by way of a bolt 35 rotatably supported in the guide element 15'. A guide bolt 37 is secured at the lever 36, which during initiation forward displacement of the travels along a curved cam track 38 and pivots the entrainment member 6' in a positively controlled manner from its rest position into its transporting position. The entrainment member 6' thereby rotates out of its rest position against the force of a spring 39, without contacting the center column 10.

The guide element 15' is displaceably retained in a guide rail 3'. For this purpose, the guide element 15' includes advantageously a lug 41 secured by means of screws or bolts 40. Slide shoes 42 are provided at the ends of the lug 41, which engage in the guide rail 3'. The displacement of the guide element 15' is again effected by an end portion 43 of a threaded cable (not shown). The end portion 43 extends inside of a guide sleeve 44 which is slotted in the direction toward the guide element 15' and is arranged adjacent the guide rail 3'. The guide rail 3', the curved cam surface 38' and the guide sleeve 4 are secured at a plate 45 by welding or the like. The plate 45 itself can be bolted to an inner door sheet metal member or the like by way of through-openings 45a.

As shown in FIG. 5, the lever 36 includes a detent nose portion 36a which cooperates with a locking bolt or pin 17' which is displaceably retained in the guide element 15' and supported at the latter by way of a spring 18'. Additionally, a small plate 46 is inserted into the locking pin 17', which in turn is fixedly connected with the end section 43 of the threaded cable (FIG. 7). In the noraml situation, the threaded cable displaces, by way of its end section 43, plate 46 and locking pin 17, the guide element 15' and therewith the entrainment member 6'. If the entrainment member 6' during its forwardly directed movement in the driving direction, encounters an obstacle, then the locking pin 17' is displaced relative to the guide element 15' against the force of the spring 18'. The locking pin 17' thereby releases the detent nose portion 36a of the lever 36 and the springs 39 pivot the entrainment member 6' back into its rest position into the vehicle door.

It then follows that the rest of the transporting operation takes place in a manner corresponding to the first embodiment. After the removal or pick-up of the belt, the guide element 15' continues to travel forwardly a small distance until the entrainment member 6' or the bolt 37 encounters a locally fixed abutment and the entrainment member 6' is pivoted back into its rest position.

In another embodiment which is not illustrated, the guide bolt 37 can also be secured directly to the entrainment member 6'. Additionally, a damping spring may be interconnected between the driving threaded cable and the end section 43 for a soft starting of the movement progress.

It can also be readily seen that combinations of the individual embodiments and their features can be provided in accordance with the present invention. Thus, for example, the entrainment member 6 according to FIG. 2 may also be pivoted into its transporting position by way of a curved cam track similar to that of FIG. 6 instead of by way of the center column 10.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the displacement of a belt band into a position favorable for being seized in motor vehicles, comprising guide rail means in a vehicle lateral wall, a guide means movable to and fro in the driving direction within the guide rail means, an entrainment means being operable during displacement thereof for engaging the belt band from behind and for transporting the belt band forwardly in the driving direction while projecting into the vehicle interior in a position approximately perpendicular to the guide rail means, and means for moveably retaining the entrainment means relative to the guide means.

2. An installation according to claim 1, wherein the vehicle lateral wall is a vehicle door.

3. An installation according to claim 1, wherein the entrainment means includes a rest position with the entrainment means being displaced substantially behind the inner surface of the vehicle lateral wall and being operable to be transferred from this rest position into the operating position for transporting the belt band, in which the entrainment means projects into the vehicle interior.

4. An installation according to claim 3, wherein means for moveably retaining the entrainment means pivotally secures the entrainment means to the guide means.

5. An installation according to claim 4, wherein the entrainment means is stopped in a position at least during the forward displacement 6. An installation according to claim 5, wherein a locking pin means displaceable against the force of a spring is supported in the guide means, said locking pin means being operable to engage in a part of the entrainment means.

7. An installation according to claim 6, wherein said part is a recess in the entrainment means.

8. An installation according to claim 6, wherein said part is a detent nose portion of said entrainment means.

9. An installation according to claim 6, wherein said part is a separate member rigidly connected with said entrainment means.

10. An installation according to claim 6, wherein said entrainment means is pivoted into its respective position by way of control edges during displacement of the guide means.

11. An installation according to claim 10, wherein the control edges are constructed as abutments in the vehicle lateral wall.

12. An installation according to claim 10, wherein the entrainment means is rigidly connected with a guide bolt which during installation of the forward displacement cooperates with a curved surface means.

13. An installation according to claim 1, wherein a locking catch having a detent nose portion is rotatably retained in the entrainment means, said locking catch being urged by a spring to project partly beyond an engaging surface of the entrainment means coordinated to the belt band, a locking element secured relative to the guide means by way of a leaf spring which is aligned approximately axially to the guide rail means, and the locking element engaging during the forward displacement in the detent nose portion of the locking catch.

14. An installation according to claim 1, wherein the entrainment means is pivotal into its transporting position against a spring force.

15. An installation according to claim 1, wherein the guide means is operatively connected with a threaded cable translatable by a motor.

16. An installation according to claim 15, wherein the connection between the cable and the guide means is constructed elastically.

17. An installation according to claim 16, wherein said cable is secured at a locking pin and is displaceable in a slotted guide sleeve arranged in the vicinity of the guide rail means.

18. An installation according to claim 13, wherein an abutment means for the actuation of a switch means controls the operation of a motor.

19. An installation according to claim 18, wherein said abutment means are arranged on said cable.

20. An installation according to claim 18, wherein said abutment means are arranged on said guide means.

21. An installation according to claim 18, wherein said abutment means are arranged on a part securely connected with said guide means.

22. An installation according to claim 13, wherein at least one damping spring means is disposed between the guide means and said cable.

23. An installation for the displacement of a belt band into a position favorable for being seized in motor vehicles, comprising guide rail means in a vehicle lateral wall, a guide means movable to and fro in the driving direction within the guide rail means, an entrainment means having a rest position and a transport position, the entrainment means being operable during displacement thereof for engaging the belt band from behind and for transporting the belt band forwardly in the driving direction while projecting into the vehicle interior in said transport position, said rest position being substantially parallel to said lateral wall, and means for moveably retaining the entrainment means at the guide means.

* * * * *